Patented June 2, 1931

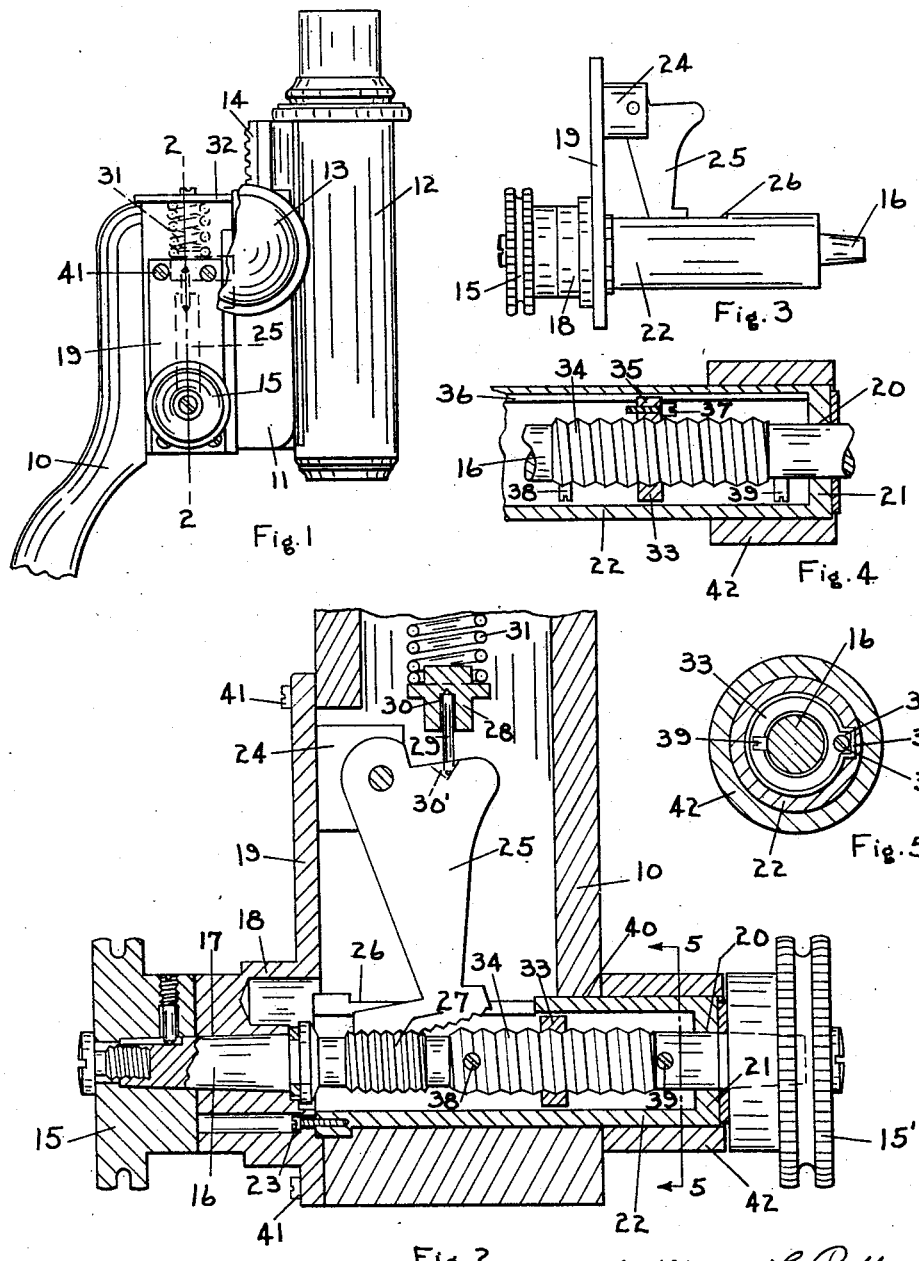

1,808,317

UNITED STATES PATENT OFFICE

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK

MICROSCOPE

Application filed April 5, 1930. Serial No. 441,990.

This invention relates to microscopes and more particularly it has reference to means for effecting a fine adjustment for focusing the instrument. The present invention is an improvement on the fine adjustment mechanism disclosed in United States Patent No. 1,123,583 issued to me on January 15, 1915. In assembling the fine adjustment mechanism disclosed in said patent, it is necessary to exercise great care in machining and fitting the bearing members into the stand of the instrument in order that the threaded adjusting shaft will rotate freely in its bearings while still fitting properly without looseness therein.

One of the objects of my invention is to provide a fine adjustment mechanism for a microscope which will be compact and simple of structure yet efficient in operation. Another object is to provide a fine adjustment device which can be manufactured and assembled as a unit and then readily fitted to the stand of the instrument. Still another object is to provide improved means for limiting the motion of a fine adjustment mechanism having a threaded adjusting member so as to prevent injury to the threads.

These and other objects and advantages reside in certain novel features of construction, arrangement and combination of parts as will hereinafter be more fully described and pointed out in the appended claims.

Referring to the drawings:

Fig. 1 shows a fragmentary side elevation of a microscope embodying my invention.

Fig. 2 is a fragmentary sectional view taken on line 2—2 of Fig. 1.

Fig. 3 is a side elevation of my improved fine adjustment unit.

Fig. 4 is a fragmentary horizontal sectional view of my fine adjustment unit.

Fig. 5 is a vertical sectional view taken on line 5—5 of Fig. 2.

A preferred embodiment of my invention is illustrated in the drawings as applied to a microscope having the stand 10 on which is mounted the slide 11 carrying the body tube 12. Coarse adjustment of the body tube is effected by means of the knurled disk 13 and a pinion, not shown, which cooperates with rack 14, all as is well known to those skilled in the art.

Fine adjustment of the body tube is produced by rotating either of the knurled knobs 15 or 15' which are attached, respectively, to the two ends of the rotatable shaft 16. One bearing for the shaft 16 is formed by the opening 17 in the boss 18 which is integral with the plate 19. The other bearing for the shaft 16 is provided at 20 in the closed end 21 of a cylindrical tube 22 whose open end is held against the inner wall of boss 18 by means of screws 23. Pivotally mounted on the boss 24, formed integral with plate 19, is the gear segment 25 whose depending end passes through slot 26 formed in tube 22 to cooperate with the threaded portion 27 on shaft 16. Secured to slide 11 is the projection 28 which is operatively connected to the gear segment 25 by means of a pin 29 whose two ends are mounted, respectively, in aligned recesses 30 and 30' formed in the projection and the segment. A coil spring 31, held in place by plate 32, bears downwardly on the projection 28 and tends to urge the slide 11 downward. From the foregoing it will be apparent that the tube 12 may be adjusted by rotation of the shaft 16 by means of knurled disk 15 or 15'.

In order to provide stop means for limiting the movement of the gear segment 25 in either direction so as to avoid damage to threads 27, a traveling nut 33 is cooperatively mounted on the threaded portion 34 of shaft 16. The nut 33 has an outwardly projecting tongue 35 which projects into the longitudinal groove 36 formed on the inside surface of tube 22 whereby the nut 33 is prevented from turning but will move longitudinally along the axis of shaft 16 as the shaft is rotated. A screw 37 is secured to tongue 35 to provide two projections which cooperate respectively with the two stop screws 38 and 39 which are secured to shaft 16. As the shaft 16 is rotated in one direction, the nut moves along until one end of screw 37 contacts with the limiting stop 38 whereupon further rotation of the shaft 16 is prevented and a similar action occurs when shaft 16 is rotated in the opposite direction so that the other end of screw 37 contacts with the limiting stop 39.

In the process of manufacturing my fine adjustment mechanism, it can be assembled as a unit such as shown in Fig. 3. This assembled unit can then be applied to the microscope stand with the tubular member 22 projecting through the opening 40 in stand 10, after which the plate 19 is secured to the stand by screws 41, the collar 42 is put in place and the knurled disk 15' is fastened to shaft 16. Since the bearings for the shaft 16 are in the bushing 18 and the tube 22 of the assembled unit, the unit may be applied to the microscope stand without the accurate fitting and machining such as is necessary in the prior construction. My improved device also embodies a simple and compact means for limiting the rotation of the shaft 16.

From the foregoing it will be obvious that I am able to attain the objects of my invention and provide an improved fine adjustment mechanism for microscopes which can be advantageously manufactured and assembled and will be simple and compact in structure yet efficient in operation. Although I have shown only one embodiment of my invention, it is obvious that various modifications can be made without departing from the spirit of my invention as pointed out in the appended claims.

I claim:

1. A microscope having in combination a stand, an adjustable body tube mounted on said stand, a bushing detachably secured to said stand, a member carried by said bushing, means for adjusting said body tube in opposite directions embodying a rotatable shaft, said shaft having its bearings in said bushing and said member.

2. In a microscope, the combination of a stand having a body tube adjustably mounted thereon, a bushing secured to said stand, a closed tubular member secured to said bushing, means for moving said body tube comprising a threaded rotatable shaft mounted within said tubular member, said tubular member having a slot, a gear segment projecting into said slot and cooperating with said threaded shaft.

3. A microscope having in combination a stand, an adjustable body tube mounted on said stand, a bushing detachably secured to said stand, a tubular member secured to said bushing, means for moving said body tube comprising a threaded shaft rotatably mounted in said bushing and tubular member, said tubular member having a groove, a nut mounted on said shaft, said nut having a tongue projecting into said groove.

4. In a microscope, the combination with a stand, a body tube adjustably mounted on said stand, a bushing detachably secured to said stand, a tubular member secured to said bushing, means for moving said body tube comprising a threaded shaft rotatably mounted within said tubular member, said tubular member having a slot in its wall, a gear segment pivotally mounted on said bushing, said segment projecting through said slot to cooperate with said threaded shaft.

WILLIAM L. PATTERSON.